United States Patent
Fraser

(10) Patent No.: US 9,371,001 B2
(45) Date of Patent: Jun. 21, 2016

(54) SUDDEN ACCELERATION SHUTDOWN DEVICE USING HYDRAULIC BRAKE PRESSURE DETECTOR TO DISABLE VEHICLE ON DRIVER PANIC

(71) Applicant: The Trustees of Dartmouth College, Hanover, NH (US)

(72) Inventor: Douglas Fraser, Fairlee, VT (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 0 days.

(21) Appl. No.: 14/395,736

(22) PCT Filed: Apr. 19, 2013

(86) PCT No.: PCT/US2013/037438
§ 371 (c)(1),
(2) Date: Oct. 20, 2014

(87) PCT Pub. No.: WO2013/159034
PCT Pub. Date: Oct. 24, 2013

(65) Prior Publication Data
US 2015/0100218 A1 Apr. 9, 2015

Related U.S. Application Data

(60) Provisional application No. 61/636,297, filed on Apr. 20, 2012.

(51) Int. Cl.
*B60K 28/10* (2006.01)
*B60K 28/14* (2006.01)
(Continued)

(52) U.S. Cl.
CPC . *B60K 28/06* (2013.01); *B60T 7/14* (2013.01); *B60T 17/18* (2013.01); *B60W 10/04* (2013.01);
(Continued)

(58) Field of Classification Search
CPC .......... B60K 28/06; B60T 7/14; F02D 17/04; F02D 41/22; F02D 41/042; B60W 2540/26; B60W 2540/12; B60W 2540/10; B60W 2510/182; B60W 50/10; B60Y 220/114
See application file for complete search history.

(56) References Cited

U.S. PATENT DOCUMENTS 4,901,055 A 2/1990 Rosenberg et al.
5,193,640 A * 3/1993 Lee ............................... 180/271
(Continued)

FOREIGN PATENT DOCUMENTS

| JP | 5-139183 | * | 6/1993 |
| JP | 2001012269 A | | 1/2001 |
| WO | 2006107301 A1 | | 10/2006 |

OTHER PUBLICATIONS

Derwent Abs.; KR-2004027545; Device for cutting off power in sudden acceleration; Kim; Apr. 1, 2004.*
(Continued)

*Primary Examiner* — Michael J Zanelli
(74) *Attorney, Agent, or Firm* — Lathrop & Gage LLP

(57) ABSTRACT

A safety shutdown system for a vehicle has a device for detecting a panic-level force applied to a vehicle control with a first state indicative of no detected panic-level forces, and a second state indicative of detected panic-level force. This device is coupled to disable a powerplant of the vehicle when in the second state. In particular embodiments the apparatus for detecting has a hydraulic cylinder coupled to a brake line and detects panic-level force on a brake pedal of the vehicle; and in embodiments the apparatus for detecting is adjustable. In other particular embodiments, a second device disables the powerplant of the vehicle upon detecting panic-level force on an accelerator pedal of the vehicle.

9 Claims, 4 Drawing Sheets

(51) Int. Cl.

| | |
|---|---|
| *B60K 28/00* | (2006.01) |
| *B60K 28/02* | (2006.01) |
| *F02D 41/22* | (2006.01) |
| *B60T 8/00* | (2006.01) |
| *B60K 28/06* | (2006.01) |
| *B60W 10/26* | (2006.01) |
| *F02D 17/04* | (2006.01) |
| *B60T 7/14* | (2006.01) |
| *B60T 17/18* | (2006.01) |
| *F02D 29/02* | (2006.01) |
| *B60W 10/04* | (2006.01) |
| *B60W 10/06* | (2006.01) |
| *B60W 10/08* | (2006.01) |
| *B60W 10/188* | (2012.01) |
| *F02D 41/02* | (2006.01) |
| *F02D 41/04* | (2006.01) |

(52) U.S. Cl.
 CPC ............... *B60W 10/06* (2013.01); *B60W 10/08* (2013.01); *B60W 10/188* (2013.01); *B60W 10/26* (2013.01); *F02D 17/04* (2013.01); *F02D 29/02* (2013.01); *F02D 41/22* (2013.01); *B60W 2510/182* (2013.01); *B60W 2540/10* (2013.01); *B60W 2540/12* (2013.01); *B60W 2540/26* (2013.01); *B60Y 2200/114* (2013.01); *F02D 41/021* (2013.01); *F02D 41/042* (2013.01)

(56) References Cited

U.S. PATENT DOCUMENTS

| | | | | |
|---|---|---|---|---|
| 5,797,467 | A | * | 8/1998 | Watanabe ...................... 180/271 |
| 6,345,604 | B1 | | 2/2002 | Ahrns et al. |
| 2003/0043033 | A1 | * | 3/2003 | Lee ........................... B60Q 1/44 340/463 |
| 2010/0152988 | A1 | | 6/2010 | Olofsson |
| 2011/0010034 | A1 | * | 1/2011 | Zagorski et al. ................ 701/29 |
| 2011/0295477 | A1 | * | 12/2011 | Wang et al. ..................... 701/70 |

OTHER PUBLICATIONS

Derwent Abs.; KR-2007037076; Device for preventing brake and accelerator pedals from being simultaneously operated; Kim; Apr. 4, 2007.*

PCT Application No. PCT/US2013/037438, International Search Report and Written Opinion, dated Jul. 25, 2013, 11 pages.

* cited by examiner

SUDDEN ACCELERATION SHUTDOWN DEVICE USING HYDRAULIC BRAKE PRESSURE DETECTOR TO DISABLE VEHICLE ON DRIVER PANIC

RELATED APPLICATIONS

This application is the U.S. national stage application of International Application No. PCT/US2013/037438, filed Apr. 20, 2012, which claims priority to U.S. Provisional Patent Application 61/636,297 filed 20 Apr. 2012, the disclosure of which is incorporated herein by reference.

FIELD

The present document pertains to vehicle control systems. In particular, this document describes apparatus for detecting driver panic and shutting down a vehicle.

BACKGROUND

Sudden acceleration incidents are far from unknown in the automotive industry; these are characterized by a vehicle accelerating beyond intentions of the driver. Sudden acceleration may have many causes, ranging from mechanical problems and jams, through electrical problems in "drive-by-wire" systems, to poor human factors design that may lead a driver to place a foot on an accelerator pedal while thinking that the same foot is on the brake. Sudden acceleration can lead to situations that endanger life and limb of driver and passengers, as well as bystanders, spectators, and occupants of other vehicles.

While production vehicle designs are often reviewed by safety engineers and human-factors specialists who consider sudden acceleration among other safety hazards, sudden acceleration incidents still occur despite brakes that can often overpower engines and interlocks that prohibit shifting into gear unless a foot is on the brake. Racing vehicles are particularly subject to sudden acceleration because their safety engineering budgets are often small despite their many customized parts and systems aimed at reaching high speeds, and they may have powerful motors that can overpower brakes. In particular, electric and hybrid racing vehicles designed by teams of students are becoming increasingly common.

A trend in production vehicles has been keyless-start designs. These designs usually have a push-to-start button on their instrument panel. The same button also often serves as a shutdown switch; however it may be necessary to press that switch for several seconds before shutdown occurs. These vehicles are, however, often rented to those who are used to traditional ignition-key systems, and who may not know that, for some cars, a long, steady, push may be required while repeated short pokes are ignored. Some racing vehicles have also been built with "kill switches" or "panic buttons" on the instrument panel to shut off their power systems in emergency conditions, however some drivers do not instinctively reach for those kill-switches in emergencies.

SUMMARY

A safety shutdown system for a vehicle has a device for detecting a panic-level force applied to a vehicle control with a first state indicative of no detected panic-level forces, and a second state indicative of detected panic-level force. This device is coupled to disable a powerplant of the vehicle when in the second state. In particular embodiments the apparatus for detecting has a hydraulic cylinder coupled to a brake line and detects panic-level force on a brake pedal of the vehicle; and in embodiments the apparatus for detecting is adjustable. In other particular embodiments, a second device disables the powerplant of the vehicle upon detecting panic-level force on an accelerator pedal of the vehicle.

In a first embodiment, a safety shutdown system for a vehicle has a device for detecting a panic-level force applied to a vehicle control with a first state indicative of no detected panic-level forces, and a second state indicative of detected panic-level force. This device is coupled to disable a powerplant of the vehicle when in the second state.

In another embodiment, a method of preventing unintentional acceleration in a motor vehicle having a powerplant includes providing apparatus for detecting an excess pressure on a control pedal of the vehicle; allowing vehicle operation in a first state, while monitoring pressure on the control pedal; and upon detection of excessive pressure on the control pedal, entering a second state and disabling vehicle powerplant operation.

DETAILED DESCRIPTION OF THE EMBODIMENTS

Most vehicles, including racing vehicles, have hydraulic braking systems. In these vehicles, pressure in hydraulic lines between a master cylinder and brake cylinders is typically proportional to force applied to the master cylinder. Typically, force applied to the master cylinder is also proportional to pressure applied by an operator up to a limit of pressure amplification provided by power braking systems; although additional force may be applied by the operator.

A panicked operator can often provide very high forces to vehicle pedals, far higher than forces normally applied during vehicle operation. In sudden-acceleration incidents, accelerator linkage may even be bent. Should the panicked operator in fact be applying pressure to a brake pedal, higher pressures than those ordinarily encountered during braking may be present in hydraulic lines of the hydraulic brake system.

We have determined that an operator of a vehicle undergoing an unexpected acceleration may therefore apply high forces to one or more pedals. Further, we believe that detecting high pedal forces, and interrupting vehicle power when high, panic-level, pedal forces occur, can result in improved vehicle safety.

In the illustrated embodiments, components having the same reference number in different drawings are intended to have similar function.

Figure 3:
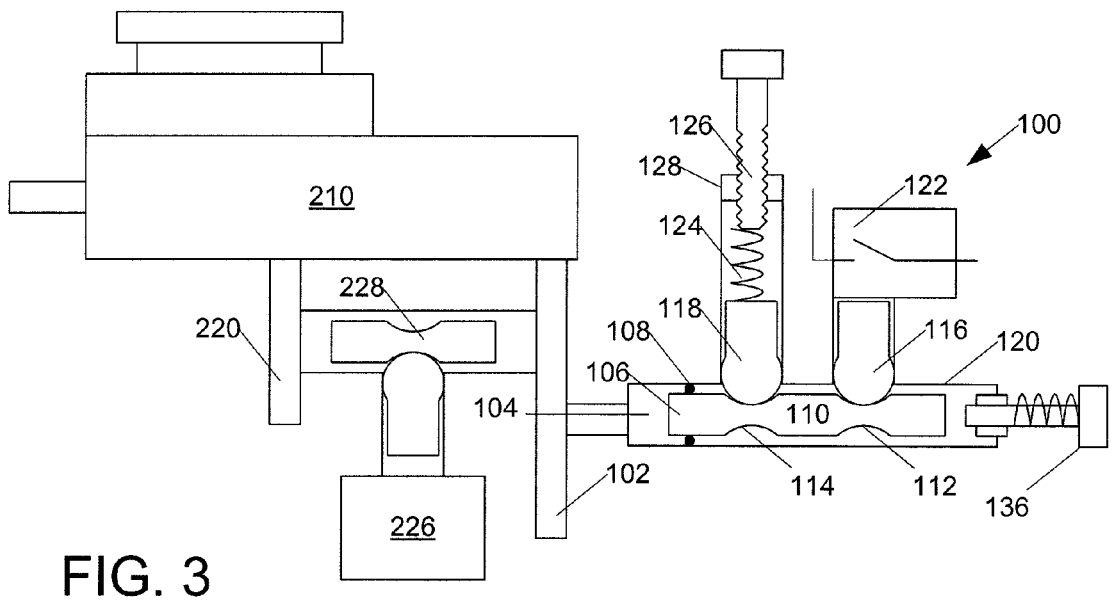
FIG. 3 is a schematic illustrating hydraulic portions of the pressure-detection switch.

An adjustable, latching, resettable hydraulic pressure switch 100 is illustrated schematically in FIG. 3. In these embodiments, hydraulic brake fluid from a vehicle brake line 102 acts in a small slave cylinder 104 on an end of piston 106. Piston 106 is sealed to prevent leakage by an O-ring 108 or other seal. In the embodiment of FIG. 3, piston 106 has a shaft 110, having a first 112 and second 114 notch. A first plunger 116 is arranged to ride in first notch 112 and a second plunger 118 is arranged to ride in second notch 114 when the shaft 110 is in a reset position, or first state, as illustrated in FIG. 3. Shaft 110 has a triggered position, or second state, not shown, where first and second plungers 116, 118, ride on a body of shaft 110, body of shaft 110 holding the first and second plunger further outwards from a center of a bore 120 in which shaft 110 rides (bore 120 is not shown in FIG. 1 to better illustrate shaft 110 and plungers 116, 118).

Plunger 116 (FIG. 3) is coupled to actuate a sensing switch 122, which in an embodiment is a normally-closed switch placed in series with ignition primary circuitry of a vehicle's gasoline engine, a fuel-valve solenoid of a vehicle's diesel engine, or a high-current switch in series with a motor controller of an electric vehicle; the sensing switch is thereby coupled to disable a powerplant of the vehicle whether the powerplant be a gasoline engine, diesel engine, or an electric motor. In an alternative embodiment, switch 122 is a low-current sensing switch in series with a coil of a high current relay or solenoid operated, high-current, normally-open switch 204 (FIG. 2) that, when closed, provides battery current from electric vehicle battery 207 to a controller 206 of an electric vehicle, and thence to motors 208 of a vehicle drivetrain. In embodiments, switch 122 may be also be wired in series with additional pressure-sensing switches, such as an overpressure sensing switch 210 attached to a vehicle accelerator pedal and a vehicle power-on switch (not shown). Switch 122 and plunger 116 are coupled such that switch 122 disables the vehicle drivetrain by removing power to an ignition system, preventing fuel flow, or removing power to an electric vehicle controller 206, when plunger 116 rides on body of shaft 110 outside of the associated notch.

Plunger 118 is provided with a heavy spring 124 that holds plunger 118 in the associated notch 114, thereby retaining shaft 110 in the reset position. In an embodiment, a threaded shaft 126, riding in a nut 128, is provided to adjust tension on spring 124 such that the pressure switch 100 may be adjusted to ensure that a particular driver of a vehicle, such as a racing vehicle, is capable of triggering switch 100 by applying sufficient brake pressure to force shaft 110 into the triggered position when that driver is in a panic state, but that same driver will not apply sufficient brake pressure to force shaft 110 into the triggered position during normal operation and normal braking of the vehicle. A reset plunger 136 is provided such that shaft 110 may be manually forced from the triggered position into the reset position. Shaft 110 remains in triggered position until manually reset, and therefore can be said to latch in the triggered position. Switch 100 therefore acts to detect, and latch upon detecting, panic-level pressures in hydraulic systems coupled to vehicle controls such as brake pedals; switch 100 has a first state represented by the reset position indicative of no detected panic-level pressures, and a second state represented by the triggered position indicative of detected panic-level pressures. Further, valves in an associated master cylinder and forces acting through the plungers 116, 118, tend to retain shaft 110 in the triggered position until manually reset by pressure on reset plunger 136.

In a vehicle, a standard dual-master-cylinder 210 is mounted to vehicle structure 212. Also hinged to vehicle structure 212 is a brake pedal 214 coupled through a shaft 216 to master cylinder 210. In alternative embodiments, power-brake boost devices may be coupled between cylinder 210 and shaft 216. Brake lines 220, 102, are provided for conveying fluid from cylinder 210 to brake cylinders 222 located at each wheel 224 of the vehicle, at least one line 102, 220, is coupled to switch 100. In an embodiment, a differential brake pressure sensing switch 226 is provided between lines 220, 102, having fluid capacity on sides of a differential sensing piston 228 sufficient that switch 100 can activate without hydraulic lock that may block motion of the master cylinder and prevent adequate motion of shaft 110, although this may also result in triggering a brake warning light.

Figure 1:
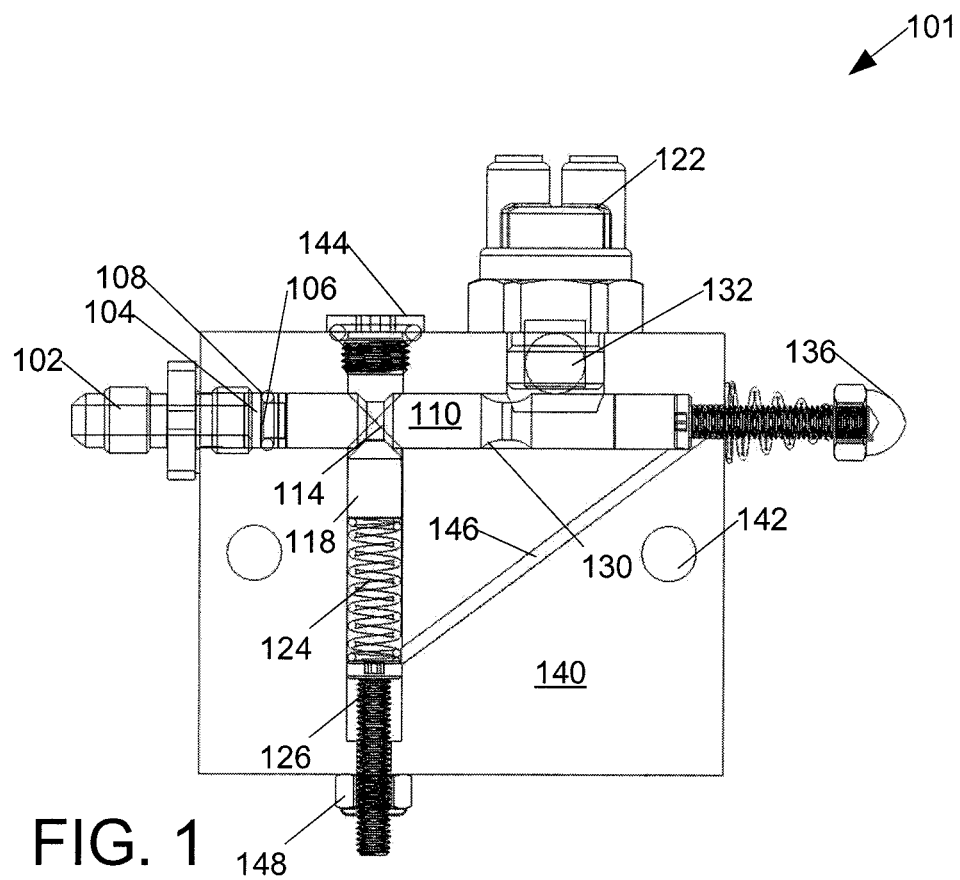
FIG. 1 is a schematic illustration of an adjustable, resettable, hydraulic pressure-detecting switch for detecting panic-level pressures in a normal, reset, position.
Figure 1A:
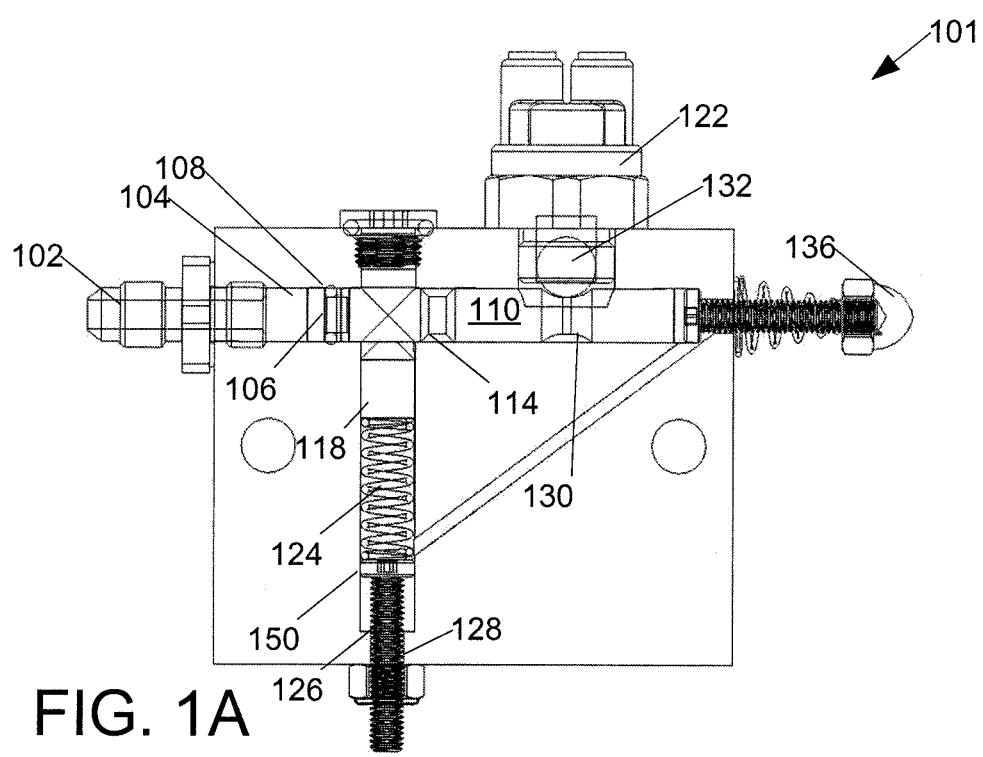
FIG. 1A is a schematic illustration of the switch of FIG. 1 in a triggered position.
Figure 2:
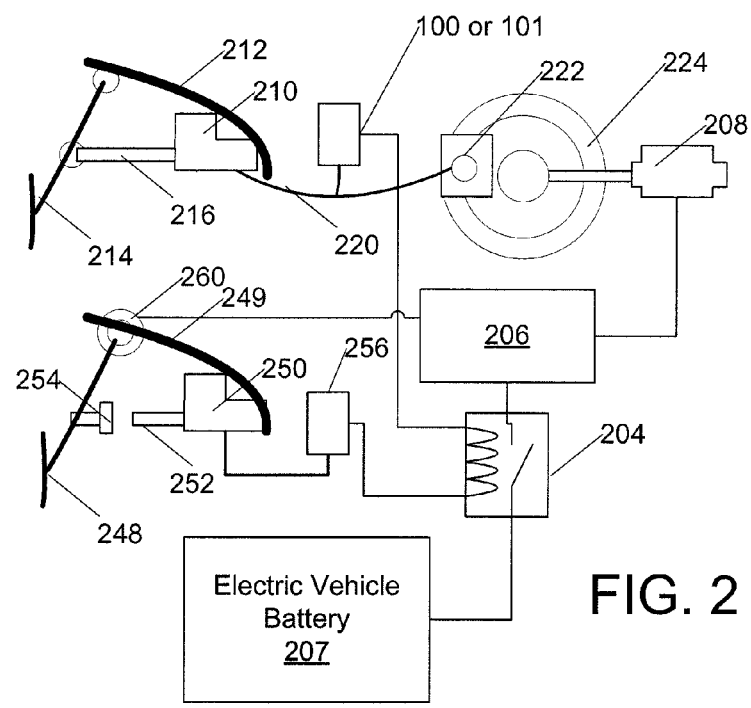
FIG. 2 is a schematic illustrating use of the pressure-detecting switch of FIG. 1 in an electric vehicle.

In an alternative embodiment 101, illustrated in FIG. 1 in a first state or reset position and in FIG. 1A in a second state or triggered position, a notch 130 in shaft 110 is disposed such that high pressure in cylinder 104 shifts notch 130 into a second state or position (FIG. 1A) such that plunger 132 drops into notch 130, and thereby trips switch 122 and removes power from ignition or vehicle controller. In the embodiment of FIGS. 1 and 1A, shaft 110 has second notch 114; in the first position or state, illustrated in FIG. 1, plunger 118 rides in notch 114 while plunger 132 rides on body of shaft 110, and in the second state or position plunger 118 rides on body of shaft 110 while plunger 132 sits in notch 130. The hydraulic pressure switch 101 of this embodiment is coupled through hydraulic lines of a hydraulic braking system of the vehicle to a master cylinder coupled to a brake pedal as illustrated in FIG. 2, and therefore is adapted to continuously monitor pressure applied to the brake pedal and to enter the second state—disabling the vehicle powerplant-on detecting excessive or panic-level pressure on that pedal.

The embodiment of FIGS. 1 and 1A may be fabricated by drilling a first bore for shaft 110 in a metal block 140. Then holes 142 are drilled for mounting bolts, the bore for shaft 110 is continued through at smaller diameter for reset plunger 136, and an entrance of the bore for shaft 110 is drilled larger and threaded for a fitting for brake line 102. A second, perpendicular to the first bore, bore is drilled for plunger 118, spring 124, and adjustment shaft 126, it is continued through at smaller diameter and threaded for adjustment shaft 126, and reamed and threaded at its entrance for a threaded plug 144. A third bore is drilled, reamed, and threaded for plunger 132 and switch 122. Additional passages, such as hole 146, may also be provided, hole 146 provides a passage for any fluid accumulated in the second bore to escape, thereby preventing hydraulic lockup. The parts are then inserted into position in the bores. A lock-nut 148 may be provided to lock adjustment shaft 126 in position. A washer 150 may be provided to prevent spring 124 from sliding over adjustment shaft 126. In an embodiment, plunger 132 and switch 122 are fabricated together as an assembly and thus installed together.

In an alternative embodiment (not shown), a single notch is provided in place of first and 112 second notch 114; in this alternative embodiment first 116 and second 118 plunger are arranged to ride in opposite sides of the single notch when the shaft is in the reset position.

In an alternative embodiment, in addition to a first pressure switch 100 or 101 coupled to a vehicle's brake system, an overpressure sensing system is provided for an accelerator pedal also. In a first variation of this embodiment an accelerator pedal 248 is hinged to vehicle structure 249, and a second master cylinder 250, also mounted to structure 249, is provided with a bumper 252. Bumper 252 is arranged to contact pedal 248, or a bumper 254 attached to pedal 248, when pedal 248 is forcefully applied. A second adjustable, resettable, latching pressure switch 256, which in an embodiment is similar to switch 100, 101, previously discussed, is provided for sensing panic-level pressures on the accelerator pedal 248, and stopping the vehicle powerplant by disabling power to the ignitions system of a gasoline engine or to the motor controller 206 of an electric vehicle. Signals from both pressure switches 256, 100, 101, may be combined by relay or solenoid switch 204, or switches 256, 100 may be wired together electrically in series, such that excessive pressure on either brake or accelerator pedal disables the vehicle powerplant. An accelerator-position potentiometer 260 which senses position of pedal 248 is provided to provide signals that control the vehicle powerplant, such as by controlling motor controller 206. In a second variation of this embodiment, a heavy spring replaces second master cylinder 250, and vehicle powerplant operation is discontinued whenever potentiometer 260 detects that pedal 248 is in a position that can only be reached when the spring is compressed past a predetermined shutdown threshold. In a third variation, a load cell is provided at an accelerator pedal stop to measure forces applied to the accelerator, and a comparator is provided to generate a signal indicative of driver panic when forces applied to the accelerator pedal exceed a predetermined panic threshold.

Figure 4:
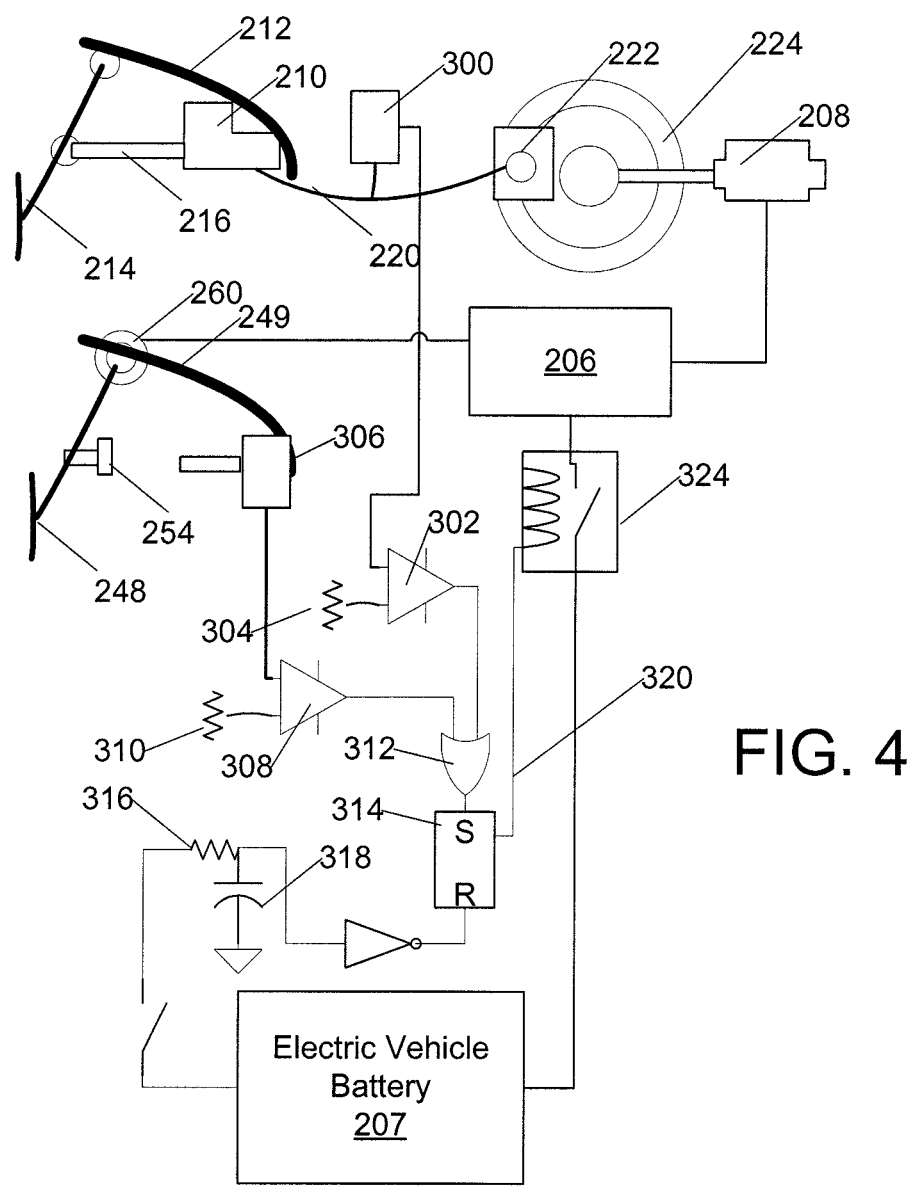
FIG. 4 is a schematic illustrating a system having electronic detection of panic-level brake and/or accelerator pressures.

In another embodiment, an electronic pressure sensor 300 is used to sense high brake-line pressures as illustrated in FIG. 4. Electronic signals from pressure sensor 300 are compared by comparator 302 to an adjustable reference threshold provided by a potentiometer 304. An electronic force sensor or load-cell 306 is positioned to serve as a stop, or to sense pressure applied to a stop of, accelerator pedal 248. Electronic signals from load cell 306 are compared by comparator 308 to an adjustable reference threshold provided by a potentiometer 310. Electronic signals indicative of sensed panic-level forces from comparators 302, 308, are combined by OR gate 312 and used to SET an R-S flip-flop 314 to a second state. A power-on reset system, including a resistor 316, and capacitor 318, is provided to reset flip-flop 314 to a first state on power up, and to provide for resetting flip-flop 314 by manually turning off, then turning on, power to the system. An output signal 320 from flip-flop 314 is provided to disable the vehicle powertrain 208 by opening a relay or solenoid-operated switch 324 whenever panic-level forces are detected in either accelerator or brake sensors. The flip-flop 314 is reset when the vehicle main ignition or power switch is turned off, thereby re-enabling vehicle operation when the vehicle main ignition or power switch is turned on again and the excessive or panic-level forces are no longer present.

Figure 5:
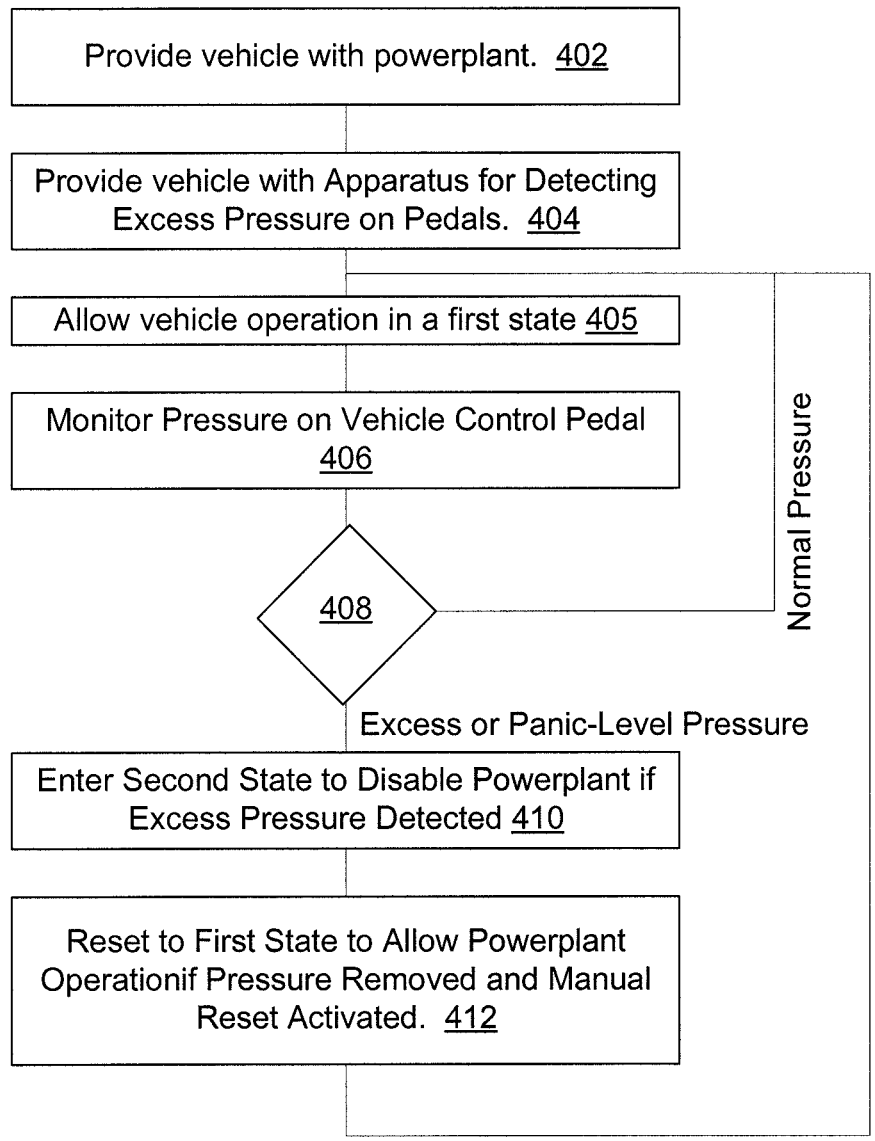
FIG. 5 is a flowchart illustrating the method of using the device of FIG. 1-FIG. 4 to disable vehicle powerplant upon panic-level control force detection.

A method of operating the vehicle is illustrated in FIG. 5. The vehicle is provided 402 with a powerplant, which in an embodiment is a gasoline engine, in another embodiment is a diesel engine, in another embodiment is an electric motor provided with a battery or other energy storage device, and in another embodiment is a hybrid power system having both an engine and an electric motor. In all embodiments, the vehicle is provided 404 with at least one apparatus, which may be the apparatus discussed above with reference to FIG. 1, 2, or 3, for detecting excessive, or panic-level, pressures on control pedals of the vehicle. In operation, the system is in a first state 405 where control pressures are monitored 406 to determine whether they are normal control forces or control pressures, or whether they are in an excess or panic-level pressure range. If 408 they are normal pressures, monitoring 406 continues and the system remains in a first state. If 408 they are excessive or panic-level pressures, the system enters a second state where operation of the vehicle powerplant is disabled 410. When the excessive or panic-level pressures are removed, operation of the vehicle powerplant may be re-enabled 412 manually, returning the system to the first state, by pressing a reset button or turning an ignition or main power switch off and back on.

Combinations

The features and methods herein described may be present in more than one combination in a system. The excess or panic-level resettable pressure sensing switches herein discussed may be provided on one or both of accelerator and brake pedals. It is anticipated that some embodiments may use relays or solenoids, or a motor controller, to disable the powerplant, while other embodiments may directly switch an ignition wire to disable the powerplant. In particular, it is anticipated that the following features may be combined in various embodiments.

A safety shutdown system designated A for a vehicle including apparatus for detecting a panic-level force applied to a vehicle control, the apparatus for detecting further comprising a switch having a first state and a second state; wherein the first state of the switch is indicative of no detected panic-level forces, and the second state is indicative of detected panic-level force; and wherein the apparatus for detecting is coupled to disable a powerplant of the vehicle when in the second state.

A safety shutdown system designated AA including the safety shutdown system designated A wherein the apparatus for detecting comprises a hydraulic cylinder coupled to a brake line of the vehicle for detecting panic-level force applied to a brake pedal of the vehicle.

A safety shutdown system designated AB including the safety shutdown system designated A wherein the apparatus for detecting comprises an electronic pressure sensor.

A safety shutdown system designated AC including the safety shutdown system designated A, AB, or AA wherein the switch is manually resettable from the second state to the first state.

A safety shutdown system designated AD including the safety shutdown system designated A, AB, AA, or AC wherein the apparatus for detecting has an adjustable threshold for detecting panic-level forces.

A safety shutdown system designated AE including the safety shutdown system designated A, AB, AA, AC, or AD further comprising a second apparatus for detecting a panic-level force applied to a vehicle control, the second apparatus for detecting coupled to disable the powerplant of the vehicle upon detecting a panic-level force on an accelerator pedal of the vehicle.

A safety shutdown system designated AF including the safety shutdown system designated A, AB, AA, AD, or AE wherein the switch of the apparatus for detecting is manually resettable from the second state to the first state.

A method designated B of preventing unintentional acceleration in a motor vehicle having a powerplant including providing apparatus for detecting an excess pressure on a control pedal of the vehicle; allowing vehicle operation in a first state, while monitoring pressure on the control pedal; and upon detection of excessive pressure on the control pedal, entering a second state and disabling vehicle powerplant operation.

A method designated BA including the method designated B wherein the apparatus for detecting an excess pressure on the control pedal incorporates at least one hydraulic piston.

A method designated BB including the method designated B further comprising providing apparatus for detecting an excess pressure on a second control pedal of the vehicle; and wherein, upon detection of excessive pressure on the second control pedal, vehicle powerplant operation is disabled.

While the forgoing has been particularly shown and described with reference to particular embodiments thereof, it will be understood by those skilled in the art that various other changes in the form and details may be made without departing from the spirit and hereof. It is to be understood that various changes may be made in adapting the description to different embodiments without departing from the broader concepts disclosed herein and comprehended by the claims that follow.

What is claimed is:

1. A safety shutdown system for a vehicle comprising:
apparatus for detecting a panic-level force applied to a vehicle control, the apparatus for detecting comprising a hydraulic pressure sensing device coupled to a brake line of the vehicle for detecting panic-level force applied to a brake pedal of the vehicle, the hydraulic pressure sensing device comprising a switch having a first state and a second state;
wherein the first state of the switch is indicative of no detected panic-level forces, and the second state is indicative of detected panic-level force; and
wherein the apparatus for detecting is coupled to disable a powerplant of the vehicle when in the second state.

2. The safety shutdown system of claim 1 wherein the switch is manually resettable from the second state to the first state.

3. The safety shutdown system of claim 1 further comprising a second apparatus for detecting a panic-level force, the second apparatus for detecting a panic level force coupled to disable the powerplant of the vehicle upon detecting a panic-level force on an accelerator pedal of the vehicle.

4. The system of claim 1 wherein the hydraulic pressure sensing device comprises a hydraulic cylinder.

5. The safety shutdown system of claim 1 wherein the hydraulic pressure sensing device has an adjustable threshold for detecting panic-level forces.

6. A method of preventing unintentional acceleration in a motor vehicle having a powerplant comprising:
allowing vehicle operation in a first state, while monitoring pressure on a brake control pedal; and
upon detection of excessive pressure on the brake control pedal, entering a second state and disabling vehicle powerplant operation;
wherein monitoring pressure on the brake control pedal is performed by apparatus comprising at least one hydraulic piston.

7. A safety shutdown system for a vehicle comprising:
apparatus for detecting a panic-level force applied to a vehicle brake control, the apparatus for detecting comprising a switch having a first state and a second state, the apparatus configured to sense a pressure in a hydraulic line;
wherein the first state of the switch is indicative of no detected panic-level force, and the second state is indicative of detected panic-level force; and
wherein the apparatus for detecting is coupled to disable a powerplant of the vehicle when in the second state.

8. The apparatus of claim 7 where the hydraulic line is a brake line.

9. The system of claim 8 wherein the apparatus for detecting further comprises a hydraulic cylinder.

* * * * *